United States Patent
Kiyota et al.

(12)

(10) Patent No.: US 6,288,001 B1
(45) Date of Patent: Sep. 11, 2001

(54) GRAPHITE-CONTAINING MONOLITHIC REFRACTORY MATERIAL

(75) Inventors: Yoshisato Kiyota; Masato Kumagai, both of Chiba; Masao Nanbu; Shigenobu Takata, both of Kurashiki; Masakazu Iida, Akou; Noboru Komatsubara; Toyohide Yamaguchi, both of Kurashiki, all of (JP)

(73) Assignee: Kawasaki Steel Corporation, Kobe (JP)

( * ) Notice: Subject to any disclaimer, the term of this patent is extended or adjusted under 35 U.S.C. 154(b) by 0 days.

(21) Appl. No.: 09/217,836

(22) Filed: Dec. 22, 1998

(30) Foreign Application Priority Data

Dec. 25, 1997 (JP) .................................................. 9-357559

(51) Int. Cl.[7] .......................... C04B 35/103; C04B 35/66; B22D 41/02
(52) U.S. Cl. .............................. 501/100; 501/89; 501/90; 501/101; 501/119; 501/120; 501/121; 501/127; 266/165; 266/280; 266/284
(58) Field of Search ...................................... 501/100, 101, 501/119, 120, 121, 127, 89, 90; 266/165, 280, 284

(56) References Cited

U.S. PATENT DOCUMENTS 3,892,584 * 7/1975 Takeda et al. .
4,233,079 * 11/1980 Rechter et al. ........................ 501/100
4,608,356   8/1986 Nagayama .
5,932,506 * 8/1999 Bogan ................................... 501/100

FOREIGN PATENT DOCUMENTS

| A-61-14175 | 1/1986 | (JP) . |
| A-3-1667 | 1/1991 | (JP) . |
| A-6-166574 | 6/1994 | (JP) . |
| A-8-83667 | 3/1996 | (JP) . |
| 08-183667 * | 7/1996 | (JP) . |
| A-8-183666 | 7/1996 | (JP) . |
| 08-301667 * | 11/1996 | (JP) . |

* cited by examiner

Primary Examiner—David R. Sample
(74) Attorney, Agent, or Firm—Oliff & Berridge, PLC

(57) ABSTRACT

A graphite-containing monolithic refractory material comprises at least one component selected from alumina and alumina-magnesia spinel, which are divided into selected particle size regions, artificial graphite having a selected average particle size, and pitch powder. The refractory material may optionally comprise a selected amount of silicon carbide having a selected average particle size. The graphite-containing monolithic refractory material exhibits excellent casting workability at a low moisture content, and both excellent corrosion resistance and spalling resistance. The refractory material is suitable as a casting monolithic refractory material for lining a topedo ladle car.

16 Claims, No Drawings

GRAPHITE-CONTAINING MONOLITHIC REFRACTORY MATERIAL

BACKGROUND OF THE INVENTION

1. Field of the Invention

The present invention relates to a monolithic refractory material, and particularly to a monolithic refractory material having a low moisture content, excellent casting workability, and both corrosion resistance and spalling resistance. Particularly, this material is suitable as a casting monolithic refractory material for lining a torpedo ladle car.

2. Description of the Related Art

In a steel making process, a torpedo ladle car is used as a transport container for transporting a hot metal from the blast furnace to the converter, and a pre-processing bath for removing impurities such as silicon, sulfur, phosphorus, and the like, from the hot metal.

Although lining of the torpedo ladle car is generally carried out by brick laying, casting of a monolithic refractory as a lining has recently been investigated.

A material for lining the torpedo ladle car is required to have corrosion resistance which allows the material to resist the severely corrosive slag by-produced from the flux used in the above-described pre-processing of a hot metal, and resistance to spalling (referred to as "spalling resistance" hereinafter) in a working environment in which the outer periphery is confined by a shell.

From this viewpoint, an alumina-SiC-graphite brick provides excellent corrosion resistance due to the prevention of wetting with a slag, which is caused by the effect of the SiC and graphite contained therein, and maintains the high spalling resistance due to low thermal expansion, low elastic modulus, and high heat conductivity, thereby exhibiting excellent practicability.

However, in an attempt to produce a casting material by adding equal amounts of SiC and graphite of the same type as brick, a large amount of water is required for ensuring casting workability because of the low water wettability of graphite, and thus the final resultant product has an extremely high porosity, and very low practicability.

Namely, for a monolithic refractory material, it is necessary to ensure sufficient workability by adding a small amount of water, and to ensure durability close to the durability of brick. It is difficult to satisfy both of these requirements.

In order to solve the above problem, a method (refer to Japanese Unexamined Patent Publication No. 6-166574) has been previously proposed, in which an oxide such as alumina or the like, which has excellent water wettability, is ground and adhered to graphite. However, the raw material cost of the monolithic refractory is increased due to the processing cost, thereby limiting practical use of this method.

Another known method comprises applying a mechanical impact to artificial graphite or crystalline graphite (refer to Japanese Unexamined Patent Publication Nos. 8-183666 and 301667). This method also has the same economic problem as the above-described conventional technique.

Other methods are also known, in which anthracite (refer to Japanese Unexamined Patent Publication No. 8-83667) or amorphous graphite is used. It is difficult, however, to obtain an effect on the corrosion resistance and the spalling resistance by adding such materials to brick in the same manner as crystalline graphite.

As described above, at present, there is no economical casting refractory material for lining torpedo ladle cars having a low moisture content and excellent casting workability, and both corrosion resistance and spalling resistance.

SUMMARY OF THE INVENTION

In consideration of the above-described disadvantages of known materials, an object of the present invention is to provide a monolithic refractory material having a low moisture content and excellent casting workability, and both corrosion resistance and spalling resistance, without using an expensive special carbon material.

Another object of the present invention is to provide a casting monolithic refractory material suitable for lining a high-temperature vessel such as a torpedo ladle car.

In order to achieve these and other objects, the present invention provides a graphite-containing monolithic refractory material comprising (i) at least one component selected from the group consisting of alumina and alumina-magnesia spinel, (ii) artificial graphite and (iii) pitch powder, and wherein the following conditions are satisfied:

(a) the amount of the artificial graphite that has an average particle size of not less than about 100 $\mu$m to not more than about 1 mm is from about 5 to about 15 wt %;

(b) the amount of the pitch powder is from about 0.5 to about 6 wt %;

(c) the total amount of the at least one component selected from the group consisting of alumina and alumina-magnesia spinel having a particle size of more than about 1 mm to not more than about 10 mm is from about 35 to about 50 wt %;

(d) the total amount of the at least one component selected from the group consisting of alumina and alumina-magnesia spinel having a particle size of more than about 100 $\mu$m to not more than about 1 mm is X (wt %) [wherein X is a value satisfying the following equations (1) and (2)]:

$$15 - 1.5Y \leq X \leq 30 - 1.5Y \quad (1)$$

$$x > 0 \quad (2)$$

(where in the equation (1), Y represents the amount (wt %) of artificial graphite having an average particle size of not less than about 100 $\mu$m to not more than about 1 mm); and (e) the total amount of the at least one component selected from the group consisting of alumina and alumina-magnesia spinel having a particle size of not more than about 100 $\mu$m is from about 15 to about 35 wt %.

In embodiments of the graphite-containing monolithic refractory material of the present invention, (e) the amount of the at least one component selected from the group consisting of alumina and alumina-magnesia spinel having a particle size of not more than about 100 $\mu$m is preferably from about 17 to about 35 wt %.

In embodiments of the graphite-containing monolithic refractory material, (e) the amount of the at least one component selected from the group consisting of alumina and alumina-magnesia spinel having a particle size of not more than about 100 $\mu$m is preferably from about 15 to about 30 wt %, and (f) the refractory material comprises an amount of silicon carbide having an average particle size of not more than about 100 $\mu$m is preferably from about 4 to about 15 wt %.

DETAILED DESCRIPTION OF THE PREFERRED EMBODIMENTS

The present invention will be described in further detail below.

The inventors carried out various experiments for finding a carbon raw material that does not need a large amount of water and that has the ability to improve both the corrosion resistance and spalling resistance, and for optimizing the whole particle size configuration to decrease the necessary amount of water added, leading to achievement of the present invention.

The additives that can be used in the present invention, including pitch powder, artificial graphite, and silicon carbide (SiC), other additives, and the main components of the present invention including alumina and alumina-magnesia spinel, are described herein with respect to the actions, effects, desirable particle size ranges, and desirable amounts of the additives and main components.

Additives

Pitch Powder

The graphite-containing monolithic refractory material (also represented by the "monolithic refractory material" hereinafter) typically contains from about 0.5 to about 6 wt % of pitch powder.

As a result of a corrosion test using pig iron and hot metal pre-processing slag, slag penetration was suppressed by adding a smaller amount of pitch powder as compared to the amount of other carbon-containing materials, and a large effect of improving the corrosion resistance was obtained. In a table test, the use of an alumina-pitch material produced evaluation results equivalent to an alumina-SiC-graphite brick in use.

As a result of evaluation in an actual furnace, it was found that at least sufficient corrosion resistance can be obtained by adding a small amount of pitch.

However, with the addition of an amount of less than about 0.5 wt % of pitch powder, the effect of improving the corrosion resistance is low, while the addition of over about 6 wt % of pitch powder increases the porosity during heating, and adversely deteriorates the corrosion resistance. In the present invention, the content of the pitch powder is preferably from about 0.5 to about 6 wt %.

Examples of pitch that can be used as the pitch powder in the present invention include coal-tar pitch, petroleum pitch, and the like.

In the present invention, a powder of coal-tar pitch is preferably used, and a powder of coal-tar pitch comprising about 50 wt % or more of fixed carbon is more preferably used.

The particle size of the pitch powder that can be used is not limited. The average particle size is preferably in the range of from about 10 $\mu$m to about 1 mm.

The pitch powder is liquefied by heating, and moves, due to capillarity, to fine pores near the powder portion. Thus, the particle size of the pitch powder has only a small effect on the properties of the refractory.

However, with an average particle size of above about 1 mm, pitch is segregated after liquefaction, thereby deteriorating the effect of suppressing slag penetration and the effect of improving the corrosion resistance.

Conversely, with an average particle size of less than about 10 $\mu$m, the use of a large amount of pitch powder can increase the amount of water that needs to be added and is thus undesirable.

Artificial Graphite

The monolithic refractory material of the present invention preferably comprises from about 5 to about 15 wt % of artificial graphite having an average particle size of from about 100 $\mu$m to about 1 mm.

As a result of evaluation in a furnace, it was determined that the corrosion resistance is sufficiently improved by adding only pitch, as shown by the results of the table test. However, it was also found that in a working environment where the refractory material is confined by a shell, the refractory material tends to thermally expand, and cracks consequently form in the refractory material in parallel with the operation plane, thereby causing accelerated wearing of the monolithic refractory material due to spalling with an increase in the number of operations.

Therefore, it is important to improve the spalling resistance. It is thus necessary to add a large amount of carbon material which is significantly graphitized, to achieve a low elastic modulus, a low coefficient of thermal expansion and high heat conductivity.

Suitable carbon raw materials that can be significantly graphitized include, for example, crystalline graphite, kish graphite and artificial graphite. In the use of crystalline graphite and kish graphite, a large amount of water is needed to achieve casting workability. Thus the final product has a high porosity and cannot satisfactorily withstand practical use.

In regard to the artificial graphite that can be used in the present invention, it was determined from experiments that the amount of water required for achieving satisfactory workability correlates to the particle size of the artificial graphite. Particularly, fine grains require a large amount of water, while coarse grains require only a small amount of water.

Namely, for artificial graphite having an average particle size of less than about 100 $\mu$m, the amount of water needed to achieve workability is increased, and at the same time, oxidation occurs at low temperatures in air, thereby deteriorating durability.

On the other hand, for artificial graphite having an average particle size of over about 1 mm, the graphite is localized to deteriorate the effect of improving the spalling resistance. In addition, the artificial graphite is difficult to obtain, and is thus undesirable from the economical viewpoint.

For an artificial graphite content of less than about 5 wt %, it is difficult to obtain a low elastic modulus, a low thermal expansion coefficient, and high heat conductivity, and the effect of improving the spalling resistance is low. Therefore, the content of the artificial graphite is preferably about 5 wt % or more.

On the other hand, when the artificial graphite content is more than about 15 wt %, even when coarse grains of artificial graphite are used, the amount of water required to achieve satisfactory workability is increased, thereby deteriorating durability. Therefore, the content of the artificial graphite is preferably about 15 wt % or less.

Silicon Carbide

The monolithic refractory material of the present invention preferably further comprises from about 4 to about 15 wt % of silicon carbide (SiC) having an average particle size of about 100 $\mu$m or less.

Graphite has a problem of oxidation at high temperatures. For artificial graphite having an average particle size of from about 100 $\mu$m to about 1 mm, there is no possibility of oxidation up to a temperature of about 1000° C., but oxidation occurs in a high-oxygen atmosphere at higher temperatures.

Therefore, the addition of SiC powder has the advantageous effect of suppressing oxidation of graphite due to precedent oxidation of SiC.

The effect of suppressing oxidation of artificial graphite by SiC is exhibited under conditions including at temperatures of about 1300° C. or more.

The SiC powder having an average particle size of above about 100 μm has only a small effect on suppressing oxidation, and is thus undesirable.

Because SiC has the effect of suppressing oxidation of graphite as well as the effect of increasing thermal conductivity, the addition of SiC is desirable from the viewpoint of improving the spalling resistance.

For a SiC content of less than about 4 wt %, the effect of suppressing oxidation of graphite is undesirably low.

On the other hand, for a SiC content of above about 15 wt %, the effect of suppressing oxidation is not substantially further improved, and the amount of water needed to achieve satisfactory workability is increased, thereby deteriorating durability. Therefore, the SiC content is preferably about 15 wt % or less, and is more preferably form about 5 to about 10 wt %.

Other Additives

Of the additives that can be mixed with the monolithic refractory material of the present invention, pitch powder, artificial graphite having an average particle size of from about 100 μm to about 1 mm, and SiC powder as a more preferable additive, which has an average particle size of about 100 μm or less, have been described above. The amounts of these additives that can be added have been defined above. However, crystalline graphite, amorphous graphite, anthracite, a thermocurable resin, or artificial graphite having an average particle size that is not in the range of from about 100 μm to about 1 mm can be additionally added as a carbon source to decrease the specific gravity, and to increase the oxidation-load resistance. Alternatively, a SiC powder having an average particle size of above about 100 μm can be additionally added to increase heat conductivity.

The above-described other additives may be added independently or in a mixture of at least two selected additives.

Main Component

Alumina and Alumina-magnesia Spinel

The monolithic refractory material of the present invention comprises at least one component selected from the group consisting of alumina-magnesia spinel and alumina as a main component.

It is desirable to optimize the particle size distribution of the main component. Without consideration of this point, it may not be possible to add a large amount of artificial graphite and SiC while suppressing the amount of water required to achieve satisfactory workability.

In the mixing of main component grains having different particle sizes, it is important to balance the particle sizes. In a double-logarithmic graph of the particle size distribution in which the particle size is shown on the abscissa, and the accumulative volume ratio from the fine particle size is shown on the ordinate, the particle size distribution is preferably linear, and the slope thereof is preferably in the predetermined range.

In the present invention, as a result of experimental examination of the most preferable particle size distribution, it was found that the refractory material most preferably comprises from about 35 to about 50 wt % of at least one component selected from the group consisting of alumina and alumina-magnesia spinel having a particle size of from about 1 mm to about 10 mm.

For a content of above about 50 wt % in the particle size range of from about 1 mm to about 10 mm, the amount of fine grains is relatively decreased, and thus the self-flow characteristics of the refractory material deteriorate. In an extreme case, the density of the resultant refractory can be significantly decreased. In order to achieve a predetermined level of working fluidity of the refractory material, a large amount of water must be added, and thus the resultant refractory is unsatisfactory for practical use.

On the other hand, for a content of less than about 35 wt % in the above-described particle size range, the proportion of fine grains becomes relatively excessive, and the total specific surface is increased, thereby causing the need to add a large amount of water, and making the refractory material unsatisfactory for practical use.

As the alumina and alumina-magnesia spinel having a particle size of from about 1 mm to about 10 mm, an electric fused material can preferably be used. As the alumina-magnesia spinel, for example, single spinel containing about 25 wt % of MgO or a raw material having a mixed phase comprising spinel and corundum can be used.

For the slag of the torpedo ladle car having a basicity ($CaO/SiO_2$) of less than 2, single alumina is preferably used. For a basicity of the slag of over 2, alumina-magnesia spinel is preferably used.

The monolithic refractory material of the present invention preferably comprises at least one component selected from the group consisting of alumina and alumina-magnesia spinel having a particle size of from about 100 μm to about 1 mm such that the total amount is an amount X (wt %) satisfying the following equations (1) and (2):

$$15 - 1.5Y \leq X \leq 30 - 1.5Y \quad (1)$$

$$x > 0 \quad (2)$$

In the equation (1), Y represents the amount (wt %) of the artificial graphite having an average particle size of from about 100 μm to about 1 mm.

In embodiments of the present invention, because the artificial graphite having a particle size in the range of from about 100 μm to about 1 mm is contained in the monolithic refractory material, it is necessary to decrease the amount of alumina and alumina-magnesia spinel relative to the amount of the artificial graphite that is added.

In experiment, the amount of alumina and alumina-magnesia spinel is preferably decreased by a weight of 1.5 times the amount of the artificial graphite (Y in the equation (1)), and the coefficient of Y in the equation (1) is thus defined as −1.5.

When the total amount of at least one component selected from alumina and alumina-magnesia spinel having a particle size of from about 100 μm to about 1 mm is less than (15−1.5Y), fluidity deteriorates, and thus the resultant refractory is not satisfactory for practical use. On the other hand, with a total amount of over (30−1.5Y), fluidity, and particularly self-flow with no vibration applied, is undesirably diminished.

For the alumina and alumina-magnesia spinel having a particle size of from about 100 μm to about 1 mm, an electric fused material or a sintered material can preferably be used.

The monolithic refractory material of the present invention comprises from about 15 to about 35 wt % of at least one component selected from alumina and alumina-magnesia spinel having a particle size of about 100 μm or less.

When the monolithic refractory material of the present invention does not contain SiC, the refractory material preferably comprises from about 17 to about 35 wt % of at least one of alumina and alumina-magnesia spinel having a particle size of about 100 μm or less.

When the monolithic refractory material of the present invention contains SiC, the refractory material preferably contains from about 15 to about 30 wt % of at least one of alumina and alumina-magnesia spinel having a particle size of about 100 μm or less.

Namely, for at least one of alumina and alumina-magnesia spinel having a particle size of about 100 μm or less at an amount of less than about 15 wt %, fluidity, particularly the self-flow with no vibration applied, is undesirably diminished regardless of the presence of SiC.

On the other hand, for a content of above about 30 wt % when SiC is contained in the monolithic refractory material, or for a content of above about 35 wt % when SiC is not contained, fluidity is diminished. In addition, the material undesirably slightly shrinks during drying and heating at temperatures of about 1200° C. or more.

As materials for the alumina and alumina-magnesia spinel having a particle size of about 100 μm or less, a calcined material, an electric fused material or a sintered material can preferably be used.

The above-described particle size control permits the addition of a large amount of artificial graphite and SiC while suppressing the amount of water needed to achieve satisfactory workability.

Examples of other small amounts of raw materials that can be added to the monolithic refractory material of the present invention include conventional known alumina cement for imparting strength without heating, a metal such as Si for reinforcement, carbon black for refining the fluidity of the monolithic refractory material, clay, silica fine powder, various dispersants, a water reducing agent, a cement hardening adjustor, clinker for imparting positive permanent linear change after heating at high temperatures, and the like. These materials can be appropriately added according to the desired characteristics of the monolithic refractory material.

In adding small amounts of the above-described raw materials, these materials may be added independently or in a combination of at least two of the materials.

These raw materials may be combined with the above-described other additives.

The present invention and the advantages thereof are described in detail below with reference to the following examples, which are not limiting.

EXAMPLES

In 2 kg of monolithic refractory material, each of the raw materials having the compositions shown in Table 1 (Examples 1 to 17) and Table 2 (Comparative Examples 1 to 13), and residual common compounding materials (additives) such as 0.5 wt % of carbon black, 1.9 wt % of metal silicon powder, 2.0 wt % of alumina cement, 1.0 wt % of clay, and 0.1 wt % of a dispersant were compounded. To the refractory material was added a predetermined amount of water, and the resultant mixture was mixed by a universal mixer. The self flow and 15-times tap flow (target: 180 mm) were tested by using a flow table.

As the pitch powder, a powder of coal-tar pitch comprising 55 wt % of fixed carbon was used.

On the basis of the results of the test, a corrosion test was carried out for determining a composition having excellent fluidity.

Namely, a mixed material having a composition with excellent fluidity was flowed into a metal mold having the shape of a trapezoidal prism, cured for 24 hours, and then removed from the mold. The thus-obtained material was dried at 110° C. for 24 hours, maintained in a coke breeze at 500° C. for 3 hours, cooled, and then used in the corrosion test.

In the corrosion test, a crucible was assembled by eight test pieces, which were obtained by the above-described method, and a hot metal was poured into the crucible. After the temperature was increased to 1600° C. in a nitrogen flow, hot metal pre-processing slag [basicity $(CaO/SiO_2)=1.8$] was poured at intervals of 1 hour, and swept out. After holding for a total of 3 hours, the test pieces were cooled, and then cut vertically (perpendicularly to the face contacting the hot metal) to compare the maximum depth of corrosion (the interface between the hot metal and the slag) with a reference sample.

As the reference sample, an existing brick for the torpedo ladle car (alumina-7 wt %-SiC 15 wt % crystalline graphite) was used.

Some of the samples were tested with respect to porosity after they were removed from the mold, dried and then sintered in a coke breeze at 1400° C. for 3 hours.

For the compositions which exhibited excellent fluidity and indexes of corrosion in the table test, each of the compositions was mixed by a mortar mixer for 4 minutes, poured to a size corresponding to two bricks for the torpedo ladle car, cured for 24 hours, separated from the mold, dried at 110° C. for 48 hours, and then inserted into an actual furnace to evaluate durability (based on the presence of internal cracks).

Table 1 (Examples 1 to 17) and Table 2 (Comparative Examples 1 to 13) show the results of the above performance tests together with the compositions of the raw materials.

Effect of Carbon Additive

The effect of the carbon-type additive is compared. Generally, the addition of the carbon-type additive increases the amount of water required to obtain a target value of fluidity (i.e., a 15-times tap flow >180 mm). The order of the materials with respect to this increase is as follows: pitch>amorphous graphite>artificial graphite (coarse grains) >artificial graphite (fine grains)>crystalline graphite.

However, without pitch, slag penetration cannot be prevented, and the index of corrosion is high. Thus, such material is unsatisfactory for practical use (Comparative Example 1).

On the other hand, without graphite, the index of corrosion is excellent, but the spalling resistance undesirably deteriorates in evaluation in the actual furnace (Comparative Example 2).

However, the monolithic refractory material of the present invention containing both the artificial graphite and pitch exhibits excellent corrosion resistance and spalling resistance (Example 1).

In regard to the type of the graphite used, the use of crystalline graphite requires a large amount of water, and causes high porosity and index of corrosion. Thus, the material is not satisfactory for practical use (Comparative Example 3).

The use of earthy graphite achieve excellent fluidity, but undesirably does not improve the spalling resistance (Comparative Example 4).

Like the crystalline graphite, the use of fine grains of artificial graphite requires a large amount of water, and causes high porosity and high index of corrosion. Thus, such material is unsatisfactory for practical use (Comparative Example 5).

Because artificial graphite having an average particle size above the average particle size of the present invention cannot be easily obtained and is thus undesirable, such artificial graphite is was not evaluated.

On the other hand, the use of artificial graphite which satisfies the average particle size range of the present invention achieve excellent fluidity and durability (Examples 1 to 4).

In order to obtain the effect of improving the corrosion resistance by adding pitch, the content of the pitch powder should be within the range of from about 0.5 to about 6 wt % of the present invention (Examples 1 to 17). With an excessively low content, the corrosion resistance cannot be obtained (Comparative Examples 1 and 6). At an excessively high content, the porosity is high, thereby deteriorating the corrosion resistance (Comparative Example 7).

In regard to the effect of improving the spalling resistance by adding artificial graphite, with an artificial graphite content of less than about 5 wt %, the effect is low (Comparative Example 8). With an artificial graphite content of over 15 wt %, the fluidity inevitably deteriorates, and thus the material is unsatisfactory for practical use (Comparative Example 9).

On the other hand, an artificial graphite content in the range of from about 5 to about 15 wt % achieves excellent corrosion resistance and spalling resistance (Examples 1 to 17).

Effect of Particle Size Mixing of Alumina and Alumina-magnesia Spinel

With respect to particle size mixing of alumina and alumina-magnesia spinel, when the amount of coarse grains is large, and the amount of fine grains is small (i.e., the slope of a line which indicates a particle size distribution in the above-described double-logarithmic graph is high), or when the amount of coarse grains is small, and the amount of fine grains is large (i.e., when the gradient of the line is low), the fluidity is low, and the porosity is high. Thus, the material is unsatisfactory for practical use (Comparative Examples 10 and 11).

Where the particle size distribution is not linear due to an excess or a deficiency of the powder in an intermediate region of the particle size range, the fluidity is low, and the porosity is high. Thus, the material is unsatisfactory for practical use (Comparative Examples 12 and 13).

On the other hand, where a particle size mixture satisfies the range of the present invention, excellent fluidity can desirably be obtained regardless of the large amount of graphite and SiC that is contained in the composition (Examples 1 to 15).

For slag having high basicity ($CaO/SiO_2=2.5$), the corrosion resistance can be improved by partially substituting alumina with alumina-magnesia spinel (electromelted spinel) (Examples 16 and 17).

As shown in the above-described examples, the present invention can provide a casting refractory material for lining a torpedo ladle car, which comprises from about 5 to about 15 wt % of artificial graphite having an average particle size of from about 100 μm to about 1 mm, from about 0.5 to about 6 wt % of pitch powder, and further from about 4 to about 15 wt % of SiC powder having an average particle size of about 100 μm or less, wherein particle size mixing of at least one component selected from alumina and alumina-magnesia spinel is defined to exhibit excellent casting workability even with a small amount of water added, and both excellent corrosion resistance and spalling resistance are achieved.

TABLE 1-1

| | | | | (c) | | (d) | | | | |
|---|---|---|---|---|---|---|---|---|---|---|
| | (a) Graphite raw material | | (b) Pitch powder | Electric fused alumina 10 mm ≧ | Electric fused spinel 10 mm ≧ | Electric fused alumina 1 mm ≧ | Sintered alumina 1 mm ≧ | (e) Calcined alumina | (f) SiC | Amount of |
| | Average particle size (μm) | (%) | (%) ** | >1 mm (%) | >1 mm (%) | >100 μm (%) | >100 μm (%) | 100 μm ≧ (%) | (%) *** | water added (wt %) |
| Example 1 | Artificial graphite (400) | 10 | 2.0 | 44.2 | — | 6.2 | — | 22.1 | 10.0 | 6.8 |
| Example 2 | Artificial graphite (700) | 5 | 1.8 | 43.2 | — | 10.9 | — | 25.6 | 8.0 | 6.0 |
| Example 3 | Artificial graphite (300) | 5 | 1.8 | 46.1 | — | 10.8 | — | 22.8 | 8.0 | 6.0 |
| Example 4 | Artificial graphite (200) | 5 | 1.8 | 46.2 | — | 10.7 | — | 22.8 | 8.0 | 6.0 |
| Example 5 | Artificial graphite (400) | 10 | 1.0 | 46.1 | — | — | 6.7 | 23.7 | 7.0 | 7.3 |
| Example 6 | Artificial graphite (400) | 10 | 5.1 | 46.1 | — | — | 5.2 | 21.1 | 7.0 | 7.6 |
| Example 7 | Artificial graphite (300) | 5 | 1.5 | 41.2 | — | 13.0 | — | 23.8 | 10.0 | 6.2 |
| Example 8 | Artificial graphite (300) | 10 | 1.5 | 41.6 | — | 5.3 | — | 26.1 | 10.0 | 7.2 |
| Example 9 | Artificial graphite (300) | 15 | 1.5 | 41.8 | — | 0.5 | — | 25.7 | 10.0 | 8.0 |
| Example 10 | Artificial graphite (350) | 10 | 1.4 | 39.7 | — | 3.6 | — | 29.8 | 10.0 | 6.9 |
| Example 11 | Artificial graphite (350) | 10 | 1.4 | 41.0 | — | 5.1 | — | 27.0 | 10.0 | 6.9 |
| Example 12 | Artificial graphite (350) | 10 | 1.4 | 41.0 | — | — | 5.1 | 27.0 | 10.0 | 6.9 |
| | Artificial graphite | 10 | 1.4 | 46.9 | — | 10.5 | — | 15.7 | 10.0 | 7.3 |

TABLE 1-1-continued

| | (a) Graphite raw material | | (b) Pitch powder | (c) | | (d) | | (e) Calcined alumina | (f) SiC | Amount of |
| --- | --- | --- | --- | --- | --- | --- | --- | --- | --- | --- |
| | | | | Electric fused alumina 10 mm ≧ | Electric fused spinel 10 mm ≧ | Electric fused alumina 1 mm ≧ | Sintered alumina 1 mm ≧ | | | |
| | Average particle size (μm) | (%) | (%) ** | >1 mm (%) | >1 mm (%) | >100 μm (%) | >100 μm (%) | 100 μm ≧ (%) | (%) *** | water added (wt %) |
| Example 13 | Artificial graphite (350) | 10 | 1.4 | 37.5 | — | 6.0 | — | 29.6 | 10.0 | 7.5 |
| Example 14 | Artificial graphite (350) | 10 | 1.4 | 41.6 | — | 6.8 | — | 34.7 | 0.0 | 6.7 |
| Example 15 | Artificial graphite (350) | 10 | 2.0 | 17.1 | 26.0 | 1.0 | — | 28.4 | 10.0 | 6.9 |
| Example 16 | Artificial graphite (300) | 10 | 2.0 | 28.0 | 15.0 | — | 0.8 | 28.7 | 10.0 | 6.9 |
| Example 17 | Artificial graphite (300) | | | | | | | | | |

Note)
*Residual compounding materials (additives) . . . [carbon black + metal silicon powder + alumina cement + clay + dispersant] = 5.5 wt %
Total of compounding raw materials: 100.0 wt %
**Average particle size of pitch powder = 700 μm
***Average particle size of SiC = 80 μm

TABLE 1-2

| | Evaluation results | | | | | |
| --- | --- | --- | --- | --- | --- | --- |
| | Tap flow (mm) | Self flow (mm) | Porosity (%) | Index of corrosion Brick = 100 | Evaluation of actual furnace Presence of cracks | Overall evaluation |
| Example 1 | 185 | 155 | 20.8 | 115 | No | Good |
| Example 2 | 188 | 158 | 18.9 | 112 | No | Good |
| Example 3 | 188 | 156 | 18.8 | 109 | No | Good |
| Example 4 | 187 | 156 | 19.1 | 110 | No | Good |
| Example 5 | 182 | 151 | 21.7 | 115 | No | Good |
| Example 6 | 180 | 148 | 21.9 | 118 | No | Good |
| Example 7 | 182 | 153 | 22.3 | 111 | No | Good |
| Example 8 | 181 | 153 | 22.1 | 118 | No | Good |
| Example 9 | 180 | 148 | 23.5 | 120 | No | Good |
| Example 10 | 182 | 155 | 23.5 | 118 | No | Good |
| Example 11 | 185 | 152 | 23.6 | 117 | No | Good |
| Example 12 | 185 | 148 | 20.5 | 116 | No | Good |
| Example 13 | 186 | 143 | 19.8 | 118 | No | Good |
| Example 14 | 182 | 155 | 22.0 | 119 | No | Good |
| Example 15 | 181 | 156 | 20.8 | 120 | No | Good |
| Example 16 | 182 | 153 | 21.5 | 103 | No | Good |
| Example 17 | 184 | 156 | 21.3 | 105 | No | Good |

TABLE 2-1

| Comp. Example No. | (a) Other graphite Graphite raw material | | (b) Pitch powder | (c) | | (d) | | (e) Calcined alumina | (f) SiC | Amount of |
| --- | --- | --- | --- | --- | --- | --- | --- | --- | --- | --- |
| | | | | Electric fused alumina 10 mm ≧ | Electric fused spinel 10 mm ≧ | Electric fused alumina 1 mm ≧ | Sintered alumina 1 mm ≧ | | | |
| | Average particle size (μm) | (%) | (%) ** | >1 mm (%) | >1 mm (%) | >100 μm (%) | >100 μm (%) | 100 μm ≧ (%) | (%) *** | water added (wt %) |
| 1 | Artificial graphite (400) | 10 | 0.0 | 41.0 | — | 6.3 | — | 28.2 | 9.0 | 7.0 |
| 2 | — | 0 | 2.0 | 42.2 | — | 23.2 | — | 18.1 | 9.0 | 5.2 |
| 3 | Crystaline graphite (400) | 5 | 2.0 | 46.2 | — | 10.5 | — | 22.8 | 8.0 | 10.5 |
| 4 | Amorphous graphite (35) | 10 | 2.0 | 37.5 | — | 12.3 | — | 22.7 | 10.0 | 7.2 |

TABLE 2-1-continued

| | | | | Raw material composition (wt %)* | | | | | | |
|---|---|---|---|---|---|---|---|---|---|---|
| | | | | (c) | | (d) | | | | |
| Comp. Example No. | (a) Other graphite Graphite raw material Average particle size (μm) | (%) | (b) Pitch powder (%) ** | Electric fused alumina 10 mm ≧ >1 mm (%) | Electric fused spinel 10 mm ≧ >1 mm (%) | Electric fused alumina 1 mm ≧ >100 μm (%) | Sintered alumina 1 mm ≧ >100 μm (%) | (e) Calcined alumina 100 μm ≧ (%) | (f) SiC (%) *** | Amount of water added (wt %) |
| 5 | Artificial graphite (30) | 5 | 1.8 | 44.8 | — | 10.5 | — | 24.4 | 8.0 | 10.0 |
| 6 | Artificial graphite (400) | 10 | 0.3 | 46.1 | — | — | 6.7 | 24.4 | 7.0 | 7.3 |
| 7 | Artificial graphite (400) | 10 | 6.8 | 46.1 | — | — | 6.9 | 17.7 | 7.0 | 8.5 |
| 8 | Artificial graphite (300) | 3 | 1.5 | 42.8 | — | 14.1 | — | 23.1 | 10.0 | 6.0 |
| 9 | Artificial graphite (300) | 20 | 1.5 | 39.1 | — | 0.5 | — | 23.4 | 10.0 | 10.5 |
| 10 | Artificial graphite (350) | 10 | 1.4 | 51.0 | — | 8.0 | — | 14.1 | 10.0 | 9.8 |
| 11 | Artificial graphite (350) | 10 | 1.4 | 34.0 | — | 6.0 | — | 33.1 | 10.0 | 9.5 |
| 12 | Artificial graphite (350) | 10 | 1.4 | 41.0 | — | 16.0 | — | 16.1 | 10.0 | 9.7 |
| 13 | Artificial graphite (350) | 5 | 1.4 | 47.0 | — | 5.0 | — | 26.1 | 10.0 | 9.5 |

Note)
*Residual compounding materials (additives) . . . [carbon black + metal silicon powder + alumina cement + clay + dispersant] = 5.5 wt %
Total of compounding raw materials: 100.0 wt %
**Average particle size of pitch powder = 700 μm
***Average particle size of SiC = 80 μm

TABLE 2-2

| | Evaluation results | | | | | |
|---|---|---|---|---|---|---|
| | Tap flow (mm) | Self flow (mm) | Porosity (%) | Index of corrosion Brick = 100 | Evaluation of actual furnace Presence of cracks | Overall evaluation (Unsatisfied properties) |
| Comp. Example 1 | 182 | 159 | 20.5 | 165 | * | (Corrosion resistance) |
| Comp. Example 2 | 180 | 159 | 18.5 | 90 | Internal cracks | (Spalling resistance) |
| Comp. Example 3 | 160 | No flow | 32.0 | * | * | (Workability) |
| Comp. Example 4 | 185 | 155 | 21.0 | 128 | Internal cracks | (Spalling resistance) |
| Comp. Example 5 | 160 | 130 | 31.0 | * | * | (Workability) |
| Comp. Example 6 | 188 | 183 | 22.5 | 149 | * | (Corrosion resistance) |
| Comp. Example 7 | 190 | 151 | 25.9 | 138 | * | (Corrosion resistance) |
| Comp. Example 8 | 182 | 153 | 18.9 | 115 | Internal cracks | (Spalling resistance) |
| Comp. Example 9 | 165 | 130 | 28.5 | * | * | (Workability) |
| Comp. Example 10 | 178 | 155 | 28.2 | * | * | (Workability) |
| Comp. Example 11 | 180 | 152 | 29.0 | * | * | (Workability) |
| Comp. Example 12 | 181 | 120 | 28.9 | * | * | (Workability) |
| Comp. Example 13 | 180 | 145 | 29.0 | * | * | (Workability) |

Remarks)
*Because the results of evaluation before each of evaluation tests were poor, the corresponding evaluation test was not carried out.

As described above, the present invention provides a casting refractory material suitable for lining a high-temperature vessel such as a torpedo ladle car. The refractory material exhibits excellent casting workability even with a small amount of water added, and both excellent corrosion resistance and spalling resistance.

It if therefore apparent that there has been provided in accordance with the present invention, monolithic refractory materials and methods for making the monolithic refractory materials. While this invention has been described in conjunction with preferred embodiments thereof, it is evident that many alternatives, modifications, and variations be apparent to those skilled in the art. Accordingly, applicants intend to embrace all such alternatives, modifications and variations that fall within the spirit and scope of this invention.

What is claimed is:

1. A graphite containing monolithic refractory comprising:
   (i) artificial graphite having an average particle size of not less than about 100 μm to not more than about 1 mm in amount of about 5 to about 15 wt %;
   (ii) pitch powder in an amount of about 0.5 to about 6 wt %;
   (iii) a component selected from the group consisting of alumina and alumina-magnesia spinel having a particle size of more than about 1 mm to not more than about 10 mm in an amount of about 35 to about 50 wt %;
   (iv) a component selected from the group consisting of alumina and alumina-magnesia spinel having a particle size of more than about 100 μm to not more than 1 mm in an amount of X wt %, where X is a value satisfying the following equations (1) and (2):

$$15-1.5Y \leq X \leq 30-1.5Y \quad (1)$$

$$X > 0 \quad (2)$$

and Y is the amount of component (i);
   (v) a component selected from the group consisting of alumina and alumina-magnesia spinel having a particle size of not more than about 100 μm in an amount of about 15 to about 35 wt %.

2. The graphite-containing monolithic refractory material according to claim 1, wherein the amount of component (v) is from about 17 to about 35 wt %.

3. The graphite-containing monolithic refractory material according to claim 1, wherein the amount of component (v) is from about 15 to about 30 wt %, and the graphite-containing monolithic refractory further comprises from about 4 to about 15 wt % of silicon carbide having an average particle size of not more than about 100 μm.

4. The graphite-containing monolithic refractory material according to claim 1, wherein components (iii), (iv) and (v) each comprises only one of alumina and alumina-magnesia spinel.

5. The graphite-containing monolithic refractory material according to claim 1, wherein components (iii), (iv) and (v) each comprises both alumina and alumina-magnesia spinel.

6. The graphite-containing monolithic refractory material according to claim 1, wherein the graphite-containing monolithic refractory material is castable.

7. A lining for a vessel formed of the graphite-containing monolithic refractory material of claim 1.

8. The lining according to claim 7, wherein the graphite-containing monolithic refractory material is castable.

9. A method of forming a lining in a vessel comprising:
   a) providing a graphite-containing monolithic refractory material comprising the components:
      (i) artificial graphite having an average particle size of not less than about 100 μm to not more than about 1 mm in an amount of from about 5 to about 15 wt %;
      (ii) pitch powder in an amount of about 0.5 to about 6 wt %;
      (iii) a component selected from the group consisting of alumina and alumina-magnesia spinel having a particle size of not more than about 1 mm to not more than about 10 mm in an amount of about 35 to about 50 wt %;
      (iv) a component selected from the group consisting of alumina and alumina-magnesia spinel having a particle size of more than about 100 μm to not more than 1 mm in an amount of X wt %, wherein X is a value satisfying the following equations (1) and (2):

$$15-15Y \leq X \leq 30-1.5Y \quad (1)$$

$$X > 0 \quad (2)$$

where Y is the amount of component (i);
      (v) a component selected from the group consisting of alumina and alumina-magnesia spinel having a particle size of not more than about 100 μm in an amount of about 15 to about 35 wt %.
   b) adding water to the graphite-containing monolithic refractory material;
   c) mixing the graphite-containing monolithic refractory material and the water to form a mixture; and
   d) placing the mixture in the vessel to form a lining.

10. The method according to claim 9, wherein the amount of component (v) is about 17 to about 35 wt %.

11. The method according to claim 9, wherein the amount of component (v) is from about 15 to about 30 wt %, and the graphite-containing monolithic refractory further comprises from about 4 to about 15 wt % of silicon carbide having an average particle size of not more than about 100 μm.

12. The method according to claim 9, wherein components (iii), (iv) and (v) each comprises only one of alumina and alumina-magnesia spinel.

13. The method according to claim 9, wherein components (iii), (iv) and (v) each comprises both alumina and alumina-magnesia spinel.

14. The method according to claim 9, wherein the vessel is a torpedo ladle car.

15. The method according to claim 9, wherein the mixture is placed into the vessel by casting.

16. The method according to claim 9, wherein the lining comprises at least one brick.

* * * * *